United States Patent [19]
Geyer

[11] Patent Number: 5,975,449
[45] Date of Patent: Nov. 2, 1999

[54] EXTRUSION MICRO-MIXING

[76] Inventor: Paul Geyer, 210-B N. Lindell Rd., Greensboro, N.C. 27403

[21] Appl. No.: 08/858,848

[22] Filed: May 19, 1997

[51] Int. Cl.[6] ..................................................... B02C 19/22
[52] U.S. Cl. .................................... 241/260.1; 241/285.2; 241/DIG. 31
[58] Field of Search ............................. 241/260.1, 285.2, 241/DIG. 31, 186.5

[56] References Cited

U.S. PATENT DOCUMENTS

| | | | |
|---|---|---|---|
| 2,838,794 | 6/1958 | Munger et al. | 241/260.1 X |
| 4,408,725 | 10/1983 | Wenger et al. | 241/260.1 |
| 4,607,797 | 8/1986 | Enikolopow et al. | 241/23 |
| 4,720,254 | 1/1988 | Wood | 241/260.1 X |
| 4,929,086 | 5/1990 | Geyer | 366/76 |
| 4,997,137 | 3/1991 | Tolonen | 241/248 |
| 5,232,170 | 8/1993 | Yang | 241/260.1 |

*Primary Examiner*—John M. Husar
*Attorney, Agent, or Firm*—Robert W. Pitts

[57] ABSTRACT

An apparatus is provided for the pulverization of vulcanized rubber pea-size pellets. The apparatus consists of a barrel entrance, an extruder forcing section, a multiple rotor barrier section and an end discharge which presents the extrusion to a high speed wire brush-like member which shatters the extrusion into extreme small pieces. The hopper forcing section is provided with an extremely long hopper opening the design of which permits an insert which completes the barrel bore to 360 degrees. By adding inserts, the length of the forcing section is adjustable and adiabatic extrusion can be achieved. The now adjustable forcing section is followed by a section of rotor barriers, which consist of a wide top diagonal barrier crossing the extruder groove in a manner which requires all of the process material to pass through the clearance barrier top to barrel bore. The wide top barriers are provided with a set of circumferential grooves which start at capacity and end downstream at zero capacity. Spaced between said grooves is a second set of circumferential grooves which start at zero capacity and increase to capacity at the down stream side of the extrusion groove. The accepted material is directed down stream to an extrusion head which extrudes the material as a wide, thin sheet to atmosphere and a high speed wire brush-like member which shatters the exiting material into extremely small pieces. Material can be injected onto the brush to mix with the extruded particles.

20 Claims, 4 Drawing Sheets

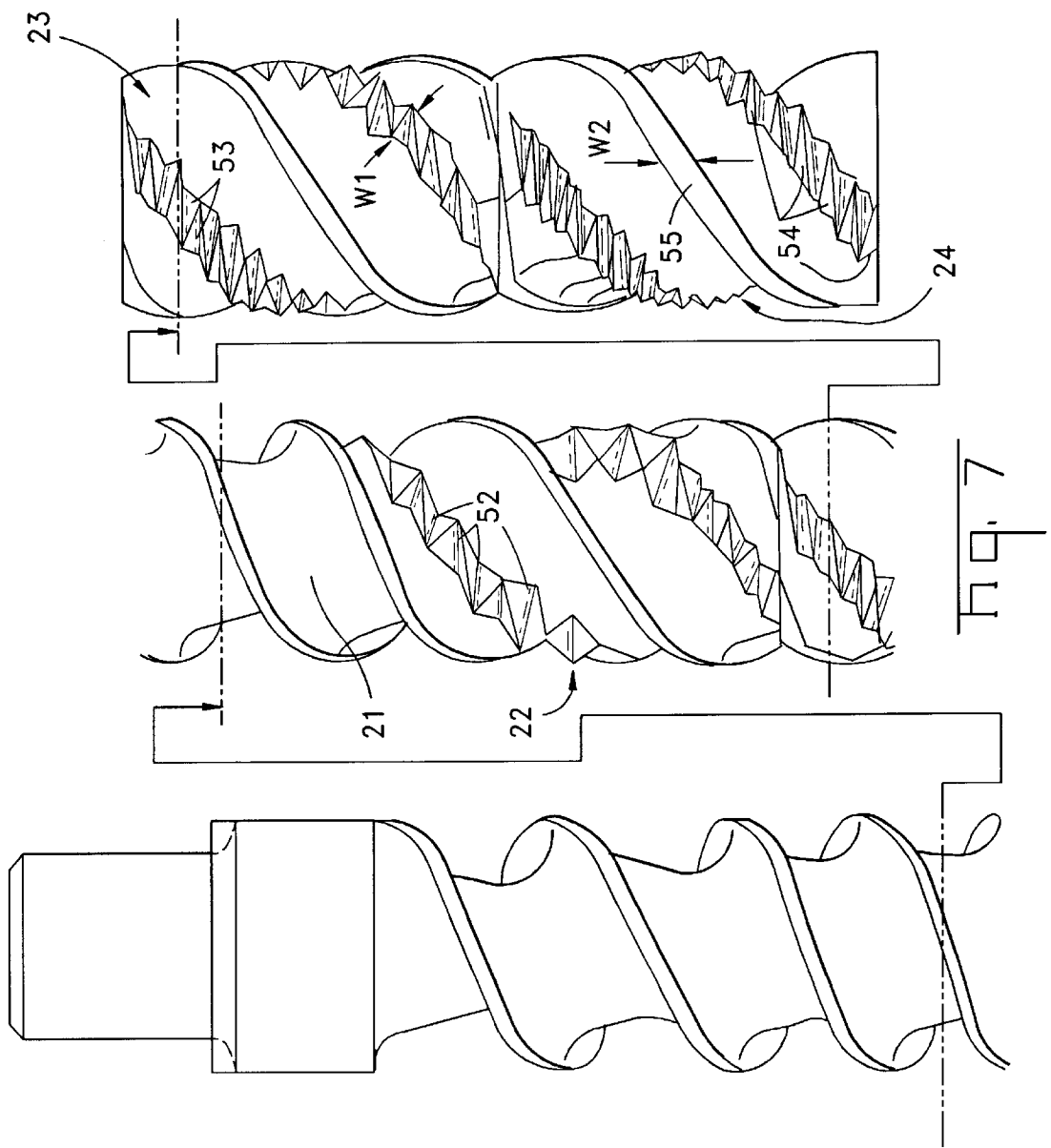

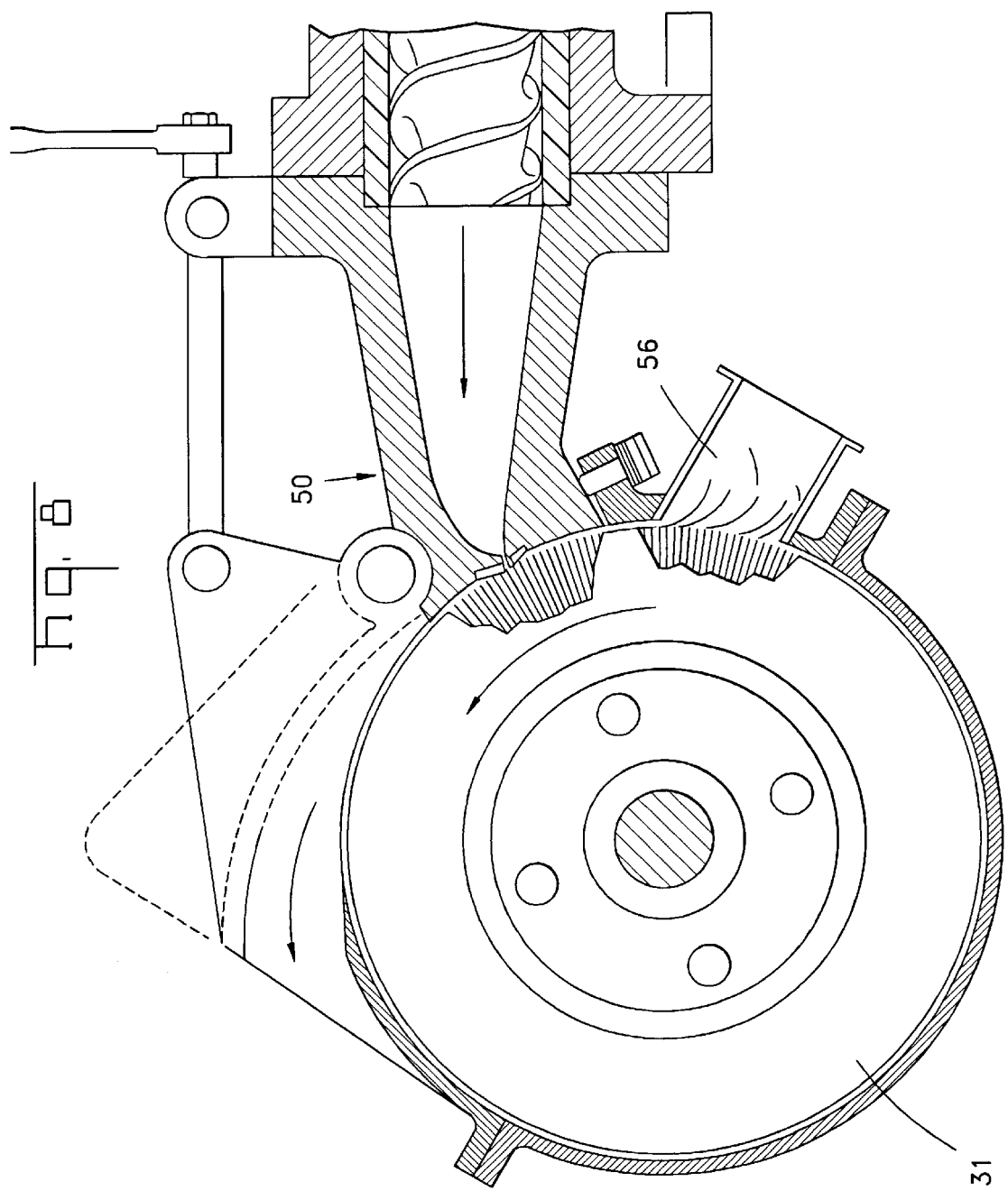

EXTRUSION MICRO-MIXING

BACKGROUND OF THE INVENTION

1. Field of the Invention

The present invention relates to an extrusion apparatus, more particularly to an apparatus of the rotor and barrel type for the reduction in size of vulcanized rubber in the form of pepper corn size pieces.

2. Description of the Prior Art

One present day method for producing pepper size pieces of vulcanized rubber from scrap tires can be considered technically successful. To reduce this material into small powder size pieces the material is frozen by means of liquid nitrogen and crushed in a ball mill. The objection to this process is the cost which limits the use of the reclaimed rubber in all but a few salable items. In any event, the growing size of scrap tire piles indicates that the cost of reclaiming must be reduced.

U.S. Pat. No. 3,375,549 discloses the barrier type extruder that is used world wide, particularly in plastic film extrusion. This patent provides a square edged entrance to the restrictive clearance barrier top to barrel bore, for the leading off of the fine and fluent process material, but this patent does not teach the use of that extruder for reducing rubber from scrap tires.

SUMMARY OF THE INVENTION

It is feature of the present invention to provide an extrusion apparatus which reduces the size of the feed material into dust size pieces without degradation of the constituent polymer, and to produce a product which will reduce the accumulation of scrap tires.

Another feature of the present invention is to provide an extrusion apparatus of the rotor and barrel type consisting of a plurality of zones including, a feeding and pressurizing section, a progressive, restrictive barrier section, an end forcing section, a thin slab extrusion head, and a high speed rotating wire brush-like member which shatters the extruded material, and a means of introducing chemicals to the shattered material.

Still another feature of the present invention is to provide a hopper and feed section, the length of which is adjustable to increase or decrease the effective length of the extruder so as to provide adiabatic extrusion where the input work to extrude is equal to the work required to warm the process material to the specified temperature.

Yet another feature of the present invention is to provide barriers which diagonally cross the extrusion grooves on the extrusion rotor, and are restrictive to extrusion flow and are provided with a wide top coacting with the barrel bore. The wide top is provided with alternate circumferential extending barrier top grooves, receiving and sending. The receiving grooves start at capacity and end at zero, the sending grooves start at zero and end at capacity. The wide tops, forming the grooves provide an extended length of barrier and, thereby, can be provided with a decreased clearance barrier top to barrel bore, without restricting extrusion flow.

Another feature of the present invention is to provide a succession of barriers each more restrictive, so that the material is progressively reduced in size.

Still another feature of the present invention is to provide receiving circumferential grooves with a depth which harbors delinquent material in a ramp-like structure which multiplies the imposed extrusion shear many times that of a square entrance barrier.

An added feature of the present invention is a wide extrusion head which forms the material into a thin sheet and presents the material to a high speed wire brush-like member which shatters the material to extremely small pieces.

Finally, these features add up to a low cost extruder with high extrusion capacity.

Other objectives, features, and advantages of the present invention will be apparent from the following detailed description of the preferred embodiment and appended claims and the accompanying drawings.

This extrusion apparatus is intended for the pulverizing of vulcanized rubber like material, either hot or cold feed. Rice size pieces of vulcanized rubber, which can be produced by conventional mechanical means of grinding larger rubber articles, such as tires, are introduced into the extrusion apparatus through the hopper and feed section. The material in introduced into the hopper opening which has an increased length so that a portion of the hopper can be changed from the hopper design to the forcing zone design without a reduction in capacity. The proposed means of changing the design is via an insert which completes the barrel bore of the hopper opening to a complete 360 degree circle. As the hopper length is adequate, the result will be to extend the forcing zone without reducing extruder capacity. Thus, the extruder is adjusted to the process material and not vice versa.

The material is then transferred downstream by the action of the rotor. The rotor and barrel members have a feed end and a discharge end is divided into a plurality of zones, including a feeding and pressurizing zone with a means of adjusting the length of the pressurizing zone.

The forcing zone rotor is changed from dual lead to single lead helical extrusion grooves which continues through the rotor barrier design, which consists of a plurality of wide top barriers, diagonally crossing the extruder grooves in a manner which diverts all of the process material through the clearance barrier top to barrel bore.

The wide topped barriers are provided with circumferential extending extruder grooves which start at capacity and end at zero capacity. The circumferential extending grooves are alternated with a second set of circumferential grooves, which start at zero capacity and end at capacity in the down stream direction. Said first set of circumferential grooves are shaped like a ramp or horn angle which provides space to harbor the reluctant material until added extruder action reduces it to acceptable size.

The multiple barriers are progressively restrictive so the material leaving the barrier zone is well sheared to as to expose the free sulfur of vulcanization to sulfides and thereby generation of a sulfate which is inert to vulcanization.

Upon leaving the barrier zone the material is directed down-stream to an extrusion head which reshapes the material into a wide, thin sheet as it is extruded to atmosphere.

The extruded material leaving the extruder is smashed by a high speed rotating wire brush-like member arranged to smash the exiting material into billions of pieces, having its own drive means, a speed can be obtained that tends to keep the brush clean.

BRIEF DESCRIPTION OF THE DRAWINGS

FIG. 7 is a view in three sections showing the rotor and the three sections of the rotor shown in FIGS. 3–5.

FIG. 8 is an view of a second embodiment of the invention showing a mixing inlet for injecting material onto the high speed brush just ahead of the entry of the extruded material to cause mixing to occur at the extruder exit.

DETAILED DESCRIPTION OF THE PREFERRED EMBODIMENT

The extrusion apparatus 40 of the present invention is of the rotor and barrel type and has a plurality of zones. The first, the feeding and pressurizing zone 12, is arranged to feed rice size pieces of vulcanized rubber into the extruder 40. Since the extruder is to be adiabatic, control of the extrusion temperature is required if more than one viscosity material is to be processed.

To accomplish temperature control the active length of the extruder is altered. The means provided is accomplished by an extended length hopper, the feed entrance of which can be moved up-stream or down-stream by means of removable blocks 42. With all blocks out, a short extruder is provided, and with the feed entrance moved to the drive end, a long extruder 40 results. In addition to capacity, extrusion temperature is controllable. This hopper device could also be applied to many existing extruders in use today, and it is not limited to use with the devulcanization process described herein.

Figure 1:
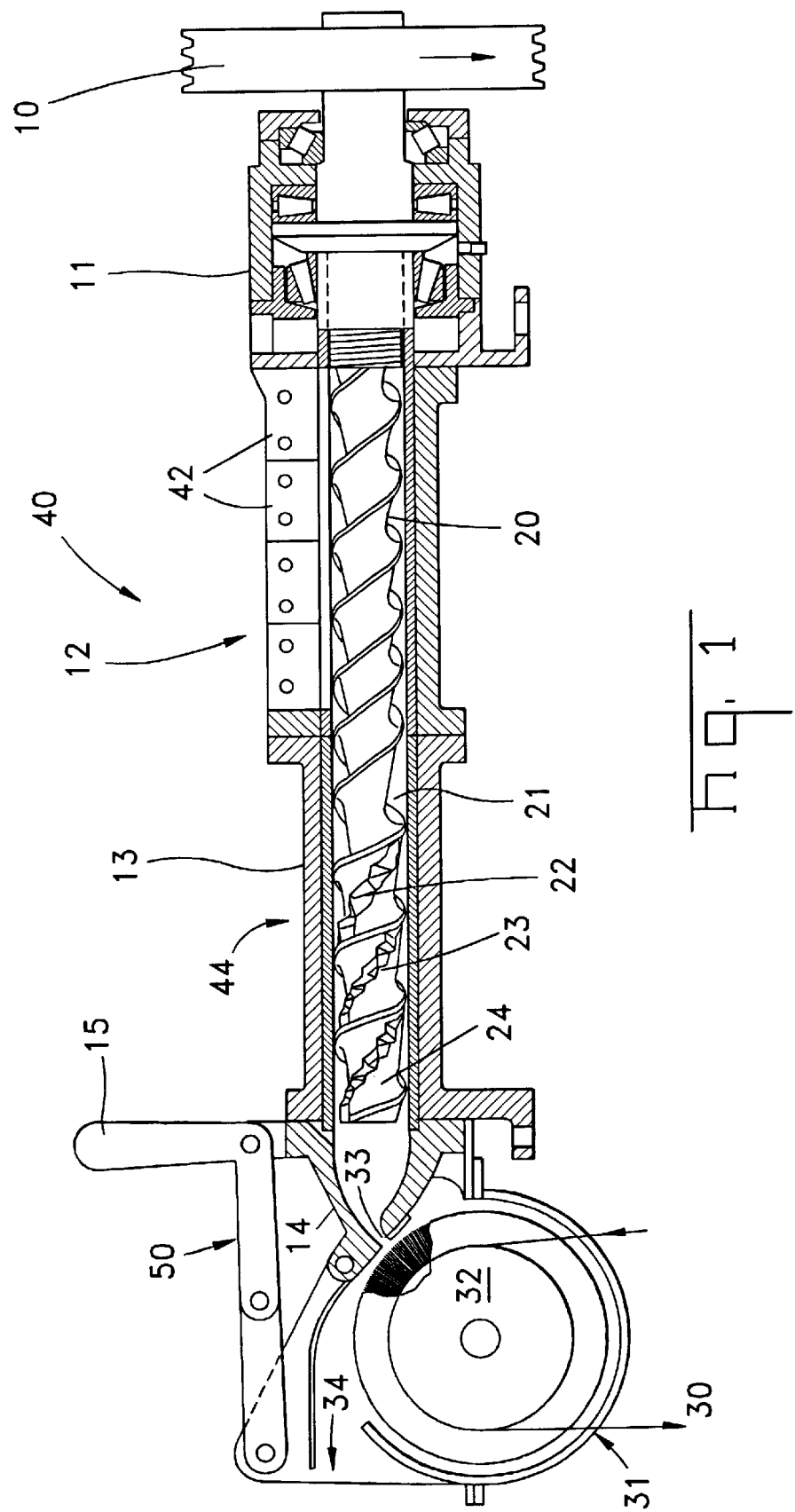
FIG. 1 is a view, partially in section showing the extruder and the high speed brush of the first embodiment of this invention.
Figure 2:
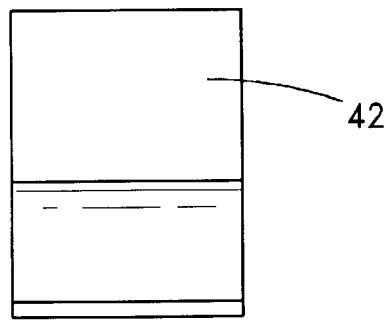
FIG. 2 is a front view of an insert used in the hopper and feed section to adjust the effective length of the extruder.
Figure 3:
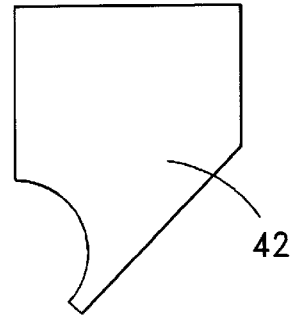
FIG. 3 is a side view of the insert shown in FIG. 2.
Figure 4:
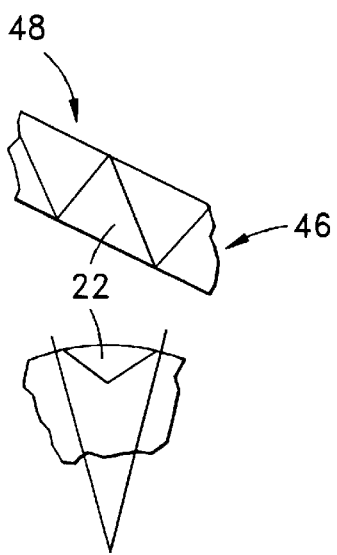
FIG. 4 is a side and top view of the wide top barriers at a first location.
Figure 5:
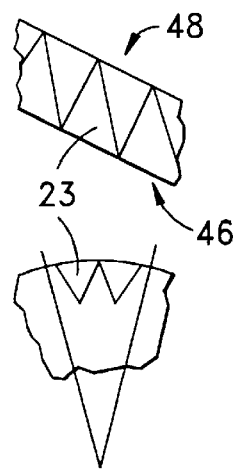
FIG. 5 is a side and top view of the wide top barriers at a second location.
Figure 6:
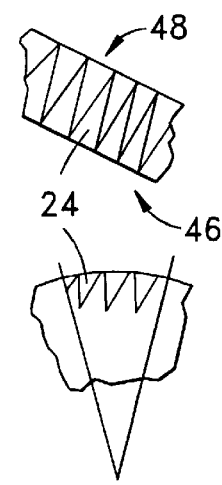
FIG. 6 is a side and top view of the wide top barriers at a third location.

FIG. 1 depicts a pulverizing apparatus 40 made in accordance with the teachings of the preferred embodiment of this invention. The extrusion pulverizing apparatus 40 broadly comprises a barrel member 13 and a rotor member 20 and 21. Rotor member 20 starts with a dual lead helical extrusion groove which changes to a single lead at groove 21. Extrusion grooves 20 and 21 feature a tapered bottom groove which increases the shear rate at the trailing side of the groove. These grooves straddling the barrel entrance are converted from hopper grooves to forcing grooves by means of insertable sections which fill the barrel opening of the hopper section and thereby supply a 360 degree barrel member. Thus, extrusion work is adjustable which is of extreme importance for adiabatic operation, where input work equals the work required to warm the process materials Following the feeding and pressurizing zone 12 the now semi-fluent material reaches the multiple barrier zone 44. The multiple barrier zone 44 is provided with wide top barriers 22, 23, 24, which diagonally cross the extrusion groove in a manner which requires all of the process material to pass through the clearance between the barrier tops and the bore of the barrel 13. The wide top of the barrier is provided with circumferential receiving grooves 46 which start at capacity and end at zero capacity as shown in FIGS. 4–6. The volume of the receiving grooves provides a harbor for reluctant material and to expose it to continued extruder action as required. The material led off over the barriers enters the adjacent sending grooves 48 which pass the material down-stream. Each circumferential receiving groove 46 develops at least double its length in barriers, so the progression of circumferential grooves can be adequate to shear the vulcanized rubber pieces. The tops of the grooves form a zig-zag barrier the length of which is extremely long as compared to the length of the barrier, and therefore can be more restrictive. The barrier groove starting at capacity presents a horn type of groove. First, it acts as a harbor, to hold the reluctant material and expose it to intense shear to make it acceptable and, second, the ramp-like structure increases the shear imposed on the material.

As shown in FIG. 7 the circumferential grooves 52 in section 22, circumferential grooves 53 in section 23, and circumferential grooves 54 in section 24 are each symmetrical about a centerline that extends normal to the axis of the rotor. These grooves are formed by a cutter that moves perpendicular to the axis of the rotor to remove material from the top of a wide crest that initially extends diagonally between adjacent ridges 55. These circumferential grooves 52, 53, 54 are side by side in the respective sections 22, 23, 24 and adjacent circumferential grooves face in opposite directions to form receiving grooves alternating with sending grooves within each section. The generally axial width W1 of the barrier in which grooves 52, 53, 54 are formed is significantly wider than the width W2 of the forcing ridges 55 so they can be referred to as wide type barriers or wide top grooved barriers. The clearance between tops of these wide top barriers and the bore of the barrel is less in the downstream section 24 than in the upstream section 22 with the clearance being intermediate in the middle section 23. The grooves 52 in section 22 are wider than the grooves 53 in section 23 which are in turn wider than the grooves 54 in section 24 so that the total length along which the tops of these grooves form ever decreasing gaps with the barrel bore is significantly greater in the downstream sections than in the upstream sections increasing the shear on the material to progressively decrease the particle size. The total length of the zig zag tops of these grooved barriers is also many times the helical path of the wide top barriers.

The horn angle design of the circumferential barrier groove tops provides a harbor for the oversize and less fluent material and subject it to the increased extrusion action required. The adjacent circumferential sending grooves receive and lead off acceptable materials and direct it down-stream to the extrusion head 14. This extrusion head forms the material into a wide, thin sheet which is extruded through opening 33 to a high speed wire brush like member which shatters the process material to dust size particles. Process material could be delivered at 2000 l b/hr and the brush can rotate at 1750 RPM by using a process and apparatus in accordance with this invention.

The extruder discharge end 50 is fitted with an extrusion head 14 which extrudes a wide, thin sheet of material to atmosphere. Attached to, and arranged to abrade the exiting material is a wide, high speed wire like brush 31 which generates particles of a size that devulcanizing chemicals can be effective.

FIG. 8 shows an alternate embodiment of this invention in which material is injected onto the brush 31 slightly ahead of the extrusion head 14. For devulcanizing rubber, sulfides can be injected through a port 56. Atomized sulphide can be injected at low pressure and relative high volume so as to be present when the brush cuts the processed dust size particles ejected as a thin sheet through extrusion head 14. The sulfide changes the free sulfur to a sulfate, devulcanizing the rubber so that it may be reprocessed. In order for this chemical action to occur the sulfur must be exposed so that it can come into contact with the sulfide. The extrusion apparatus has reduced the particle size so that the surface area of the particles has been increased to expose the sulfur for this chemical reaction. For the embodiment of FIG. 1, the mixing referred to with respect to FIG. 8 would still occur, but this mixing would take place at a location downstream of the brush 31.

In both embodiments, the accepted material is directed down stream to the extrusion head which extrudes the material as a wide, thin sheet to atmosphere and a high speed brush shatters the exiting material into extremely small pieces, the size of which exposes the free sulfur of vulcanization to chemicals which destroy the vulcanizing ability of the sulfur. Also to a size, which plasticating chemicals can penetrate so as to generate a fluent material.

With temperature control added, rubber and asphalt can be exactly measured and with exact volume control the best possible rubber, asphalt compound can be continuously produced.

Although this apparatus and method are particularly useful for devulcanizing rubber, that is not the only use for this invention. For example this embodiment of FIG. 8 could be employed in the processing of rubber asphalt.

I claim:

1. An extrusion apparatus for use in adiabatically extruding a material, the extrusion apparatus comprising:
    a barrel;
    a rotor rotating within the barrel for extruding material between the rotor and the barrel; and
    a hopper for feeding material, the apparatus being characterized in that the hopper length is adjustable for different materials so that the work performed by the extrusion apparatus can be adjusted by changing the length of the hopper to change the length of an extruder pressurizing zone so that, by adjusting the length of the hopper, the extrusion will be adiabatic for different materials even though the processing temperature for different materials may be different.

2. The extrusion apparatus of claim 1 wherein the hopper includes multiple sections that can removed to change the length of the hopper.

3. The extrusion apparatus of claim 1 wherein the rotor extends into the hopper section.

4. The extrusion apparatus of claim 1 wherein the rotor includes a dual lead helical extrusion groove in the hopper section which changes into a single lead section when the rotor enters the barrel.

5. An extrusion apparatus for reducing the particle size of a material, the extrusion apparatus comprising:
    a feeding zone;
    a pressurizing zone;
    a barrel section having a barrel bore; and
    a rotor in the barrel section, the rotor including a helical ridge, the rotor further including at least one diagonal barrier extending between spaced sections of the helical ridge, the width of the diagonal barrier being greater than the width of the helical ridge, the diagonal barrier including oppositely facing receiving grooves and sending grooves, receiving grooves and sending grooves being alternately positioned on the diagonal barrier with barrier top edges, separating adjacent receiving grooves and sending grooves being closely spaced to the barrel bore so that material passing though the barrier is forced to pass between the barrier top edges and the barrel bore so that the particle size is reduced as material passes over the barrier through the barrel.

6. The extrusion apparatus of claim 5 wherein the sending and receiving grooves are circumferential and extend perpendicular to the axis of the rotor.

7. The extrusion apparatus of claim 5 wherein the width of the receiving grooves decreases in the direction of material flow through the barrel and the width of the sending grooves increases in the direction of material flow through the barrel.

8. The extrusion apparatus of claim 5 further including multiple diagonal barriers disposed axially along the rotor.

9. The extrusion apparatus of claim 8 wherein the receiving grooves and the sending grooves from zig zag edges on each barrier.

10. The extrusion apparatus of claim 9 wherein the combined length of the zig zag edges in an relatively downstream barrier is greater than the combined length of the zig zag edges in a relatively upstream barrier.

11. The extrusion apparatus of claim 8 wherein the clearance between the diagonal barrier and the barrel bore in an upstream section is greater then the clearance between the diagonal barrier and the barrel bore in a relatively more downstream section.

12. The extrusion apparatus of claim 5 wherein each diagonal barrier extends between helical ridges of a single lead extrusion groove.

13. An apparatus for reclaiming vulcanized rubber, the apparatus comprising:
    a feeding zone into which rubber particles are introduced;
    a rotor transferring the particles to a pressurizing zone;
    a barrel having a bore, the rotor extending through the barrel and transferring the particles into the barrel, the rotor including a diagonal barrier in the barrel, the barrier including a plurality of circumferential grooves forming zig zag top edges along the top of the barrier, the length of the zig zag edges being greater than the helical path of the rotor between opposite ends of the diagonal barrier, the rotor forcing the particles between the zig zag edges and the bore of the barrel to reduce the size of the particles; and
    an extrusion head for ejecting the smaller size particles in a thin sheet so that the smaller size particles can be processed to devulcanize the rubber.

14. The apparatus of claim 13 wherein a high speed brush is positioned adjacent to the extrusion head to break up the thin sheet so that the rubber particles can be exposed to a devulcanization process.

15. The apparatus of claim 14 wherein a port is positioned adjacent to the brush so that devulcanizing chemicals can be injected onto the brush prior to engagement of the brush with the thin sheet ejected from the extrusion head.

16. The apparatus of claim 14 wherein a port is positioned adjacent to the brush so that devulcanizing chemicals can be injected onto the brush after engagement of the brush with the thin sheet ejected from the extrusion head.

17. The apparatus of claim 13 further including means for injecting material for devulcanizing the rubber.

18. The apparatus of claim 17 wherein the means for injecting material for devulcanizing the rubber includes means for injecting atomized sulphide at low pressure and relatively high volume to change free sulphur to a sulfate for devulcanizing the rubber.

19. The apparatus of claim 13 including a variable length hopper section so that the length of the extrusion apparatus can be varied for different material so that the extrusion process can be substantially adiabatic.

20. The apparatus of claim 13 wherein the zig zag edges are machined along the top of the barrier by a cutter moving substantially perpendicular to the axis of the rotor.

* * * * *